United States Patent [19]

Blore et al.

[11] 3,764,830

[45] Oct. 9, 1973

[54] STRIPLINE VIDEO PULSE GENERATOR

[75] Inventors: William E. Blore; Srbislav Zivanovic, both of Goleta, Calif.; Bernard Charest, Ste-Foy, Quebec, Canada

[73] Assignee: The United States of America as represented by the Secretary of the Air Force

[22] Filed: June 27, 1972

[21] Appl. No.: 266,816

[52] U.S. Cl. .................. 307/260, 307/281, 307/319, 333/20

[51] Int. Cl. ............................ H03k 5/00, H03k 3/26

[58] Field of Search ..................... 307/260, 281, 319; 328/55; 333/20

[56] References Cited

UNITED STATES PATENTS

| | | | |
|---|---|---|---|
| 3,374,416 | 3/1968 | Hall et al. | 307/281 X |
| 3,385,982 | 5/1968 | Raillard et al. | 307/319 |
| 3,527,966 | 9/1970 | Forge | 307/319 |
| 3,539,809 | 11/1970 | Lokerson | 307/319 X |
| 3,609,404 | 9/1971 | Uchida | 307/319 X |
| 3,676,708 | 7/1972 | Uchida | 307/319 X |

*Primary Examiner*—Stanley D. Miller, Jr.
*Attorney*—Harry A. Herbert, Jr. et al.

[57] ABSTRACT

Nanosecond video pulses are generated by a pulse forming network comprising input and output stripline sections connected by a drive inductance, a capacitor connected to ground and to the inductance by a variable tap, a potentiometer connected between the input stripline section and ground, and a step recovery diode connected between the output stripline section and ground. Input pulses fed through the drive inductance provide almost constant current drive to the step recovery diode. When the step recovery diode snaps, the step wavefront travels in both directions along the stripline. The reverse traveling wave is reflected at the AC short circuit produced by the capacitor. Pulse width is controlled by the location of the tap on the drive inductance. Pulse delay is controlled by the forward bias current through the step recovery diode by means of the potentiometer.

3 Claims, 1 Drawing Figure

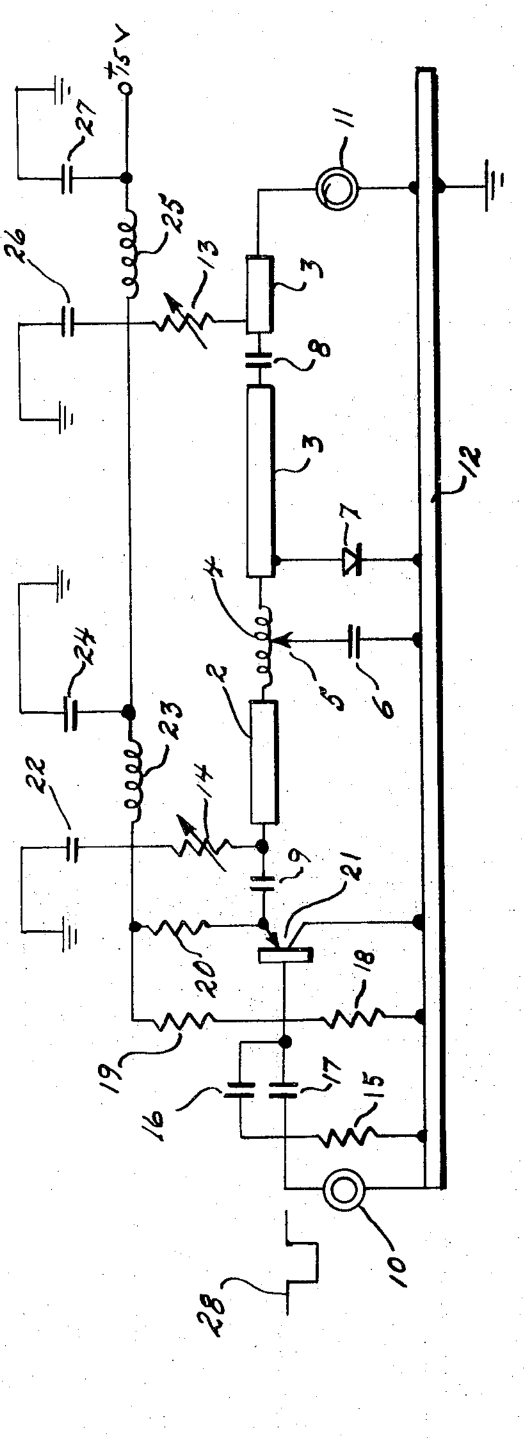
+15 V
27
26
25
13
3
11
8
3
12
7
24
4
23
2
5
6
22
14
9
21
20
18
19
17
15
16
10
28

STRIPLINE VIDEO PULSE GENERATOR

BACKGROUND OF THE INVENTION

This invention relates to video pulse generators, and in particular to pulse generators of that type capable of producing subnanosecond video pulses for application in short pulse radar systems.

Recent advances in solid state technology have allowed the generation of subnanosecond video pulses at high levels and high PRF's using step-recovery diodes. Concurrently, new high quality, high frequency diodes have permitted high resolution, low-insertion loss diode modulators with short pulse capabilities at frequencies as high as X-band. These developments have found quick application in the model radar cross-section measurement field and in the field of the measurement of the wake properties behind models in hypersonic shock tunnels and ballistic ranges. A short pulse radar utilizing such techniques is illustrated in our copending patent application entitled, *Pulsed Doppler Radar*, Ser. No. 266,815, filed on even date herewith. A low insertion loss diode modulator that can advantageously be driven by the pulse generator of the present invention is disclosed in our copending patent application entitled, *Nanosecond Pulse* modulator, Ser. No. 266,811, filed on even date herewith. Application of this type requires pulse generators capable of producing subnanosecond pulses at a 3–6 volt level having very short rise times. Existing commercial pulse generators will not produce subnanosecond pulses of several volt level with convenient biasing provisions. Although several commercial generators exist with appropriate biasing provisions and 5-volt pulse amplitude, they are limited to 1 or 2 nanosecond rise time or 2 nanosecond total width.

SUMMARY OF THE INVENTION

The video pulse generator of the present invention comprehends a pulse forming network consisting of input and output 50 ohm strip transmission lines connected by a tapped, AC shorted, inductor and a step recovery diode connected between the output strip transmission line and ground. Input pulses are fed through an emitter follower and the inductor to drive the step recovery diode. At a critical current threshold the current through the pulse forming line is suddenly interrupted by the snap action of the diode, producing a voltage pulse across the terminals of the pulse forming line.

It is a principal object of the invention to provide a new and improved video pulse generator.

It is another object of the invention to provide a video pulse generator capable of producing subnanosecond video pulses.

It is another object of the invention to provide a video pulse generator capable of delivering subnanosecond pulses at a 5 volt level having very short rise times.

These, together with other objects, features, and advantages of the invention will become more apparent from the following detailed description when taken in conjunction with the illustrative embodiment in the accompanying drawing.

DESCRIPTION OF THE DRAWING

The sole FIGURE of the drawing is a schematic diagram of a video pulse generator incorporating the principles of the present invention.

DETAILED DESCRIPTION OF THE PREFERRED EMBODIMENT

Having reference now to the sole FIGURE of the drawing, input pulses 28 are applied to an emitter follower stage of the pulse generator at BNC input connector 10. The emitter follower stage consists of transistor 21, capacitors 16 and 17, and resistors 18, 19, and 20. Resistor 15 is a 50 ohm termination for the input of the unit. The output of the emitter follower is applied through DC isolation capacitor 9 to input transmission line section 2. Input transmission line section 2 is connected to output transmission line section 3 by tapped drive inductor 4. Both input and output sections are preferably 50 ohm strip transmission line segments. Output section 3 is split to include DC isolation capacitor 8. Output pulses are delivered at BNC output connector 11. Step recovery diode 7 is connected between output transmission line section 3 and ground plane 12. AC short circuit capacitor 6 is connected between tap 5 of drive inductor and ground plane 12. The circuit comprising capacitors 22, 24, and inductor 23, and the circuit comprising capacitors 26, 27 and inductor 25 are low pass filters in the power supply leads which prevent spurious radiation of the nanosecond pulse generated by the pulse generator. Potentiometer 14 provides pulse delay control and potentiometer 13 provides output pulse position control. When output pulse 28 is fed through the emitter follower and drive inductor 4 it provides almost constant current drive to step recovery diode 7. When step recovery diode 7 snaps, the step wavefront travels in both directions along the input and output transmission line. The reverse traveling wave is reflected at the AC short circuit produced by capacitor 6. Pulse width is controlled by the location of tap 5 on drive inductor 4. Pulse delay is controlled with potentiometer 14 which determines the forward bias current through step recovery diode 7. Pulse position can be varied about 15 nanoseconds by adjustment of potentiometer 13. Output control potentiometer 13 adjusts the DC bias level on the varactor diodes in the pulse modulator. This circuit reliably produces subnanosecond video pulses at repetition rates from 0.1 to 100 MHz in a very small package.

Although the present invention has been described with reference to a specific embodiment, it is not intended that the same should be taken in a limiting sense. Accordingly, it is understood that the scope of the invention in its broader aspects is to be defined by the appended claims only and no limitation is to be inferred from definitive language used in describing the preferred embodiment.

We claim:

1. A video pulse generator comprising
an input transmission line section,
an output transmission line section,
an inductor, said inductor being connected between said input and output transmission line sections,
a step recovery diode connected between said output transmission line section and ground,
a variable tap operably engaged with said inductor, a capacitor connected between said variable tap and ground, a potentiometer connected between said input transmission line section and ground, input means connected between said input transmission line section and ground, and output means connected between said output transmission line section and ground.

2. A video pulse generator as defined in claim 1 including an emitter follower connected between said input means and said input transmission line section.

3. A video pulse generator as defined in claim 2 wherein said input transmission line section comprises a 50 ohm stripline segment, and said output transmission line section comprises first and second 50 ohm stripline segments and a capacitor, said capacitor connecting said first and second 50 ohm stripline segments.

* * * * *